United States Patent
Senoue et al.

(10) Patent No.: US 7,327,517 B2
(45) Date of Patent: Feb. 5, 2008

(54) OPTICAL MULTILAYER FILM AND REFLECTIVE SCREEN

(75) Inventors: Masaharu Senoue, Miyagi (JP); Kazuhiko Morisawa, Miyagi (JP); Shinjiro Umeya, Miyagi (JP); Kazuhito Shimoda, Kanagawa (JP); Shunichi Kajiya, Miyagi (JP)

(73) Assignee: Sony Corporation, Tokyo (JP)

( * ) Notice: Subject to any disclaimer, the term of this patent is extended or adjusted under 35 U.S.C. 154(b) by 223 days.

(21) Appl. No.: 11/156,111

(22) Filed: Jun. 17, 2005

(65) Prior Publication Data

US 2006/0001959 A1    Jan. 5, 2006

(30) Foreign Application Priority Data

| Jun. 18, 2004 | (JP) | ............................ P2004-181078 |
| Sep. 1, 2004 | (JP) | ............................ P2004-254329 |
| May 16, 2005 | (JP) | ............................ P2005-142704 |

(51) Int. Cl.
  *G03B 21/56* (2006.01)
  *G02B 1/10* (2006.01)

(52) U.S. Cl. ...................................... 359/449; 359/586

(58) Field of Classification Search ................ 359/443, 359/449, 586–588, 883
See application file for complete search history.

(56) References Cited

U.S. PATENT DOCUMENTS 6,847,483 B2 * 1/2005 Lippey et al. ............... 359/443
2004/0233524 A1 * 11/2004 Lippey et al. ............... 359/443
2005/0207007 A1 * 9/2005 Shimoda et al. ............ 359/449

FOREIGN PATENT DOCUMENTS

| DE | 197 47 597 A1 | 8/1998 |
| EP | 1 324 114 A2 | 7/2002 |
| JP | 2003-270725 | 9/2003 |
| JP | 2004-061546 | 2/2004 |

OTHER PUBLICATIONS

Rickers et al., "Design and Manufacture of Spectrally Selective Reflecting Coatings For The Use With Laser Display Projection Screens," Applied Optics, vol. 41, Jun. 2002, XP-002346084, pp. 3097-3106.

* cited by examiner

*Primary Examiner*—Christopher Mahoney
(74) *Attorney, Agent, or Firm*—Bell, Boyd & Lloyd LLP

(57) ABSTRACT

An optical multilayer film and reflective screen are provided. An optical multilayer film includes an optical laminate A including a plurality of types of optical layers having different refractive indices laminated on each other, the optical laminate A having a reflection characteristic in which the reflectance peak intensities in the red, green, and blue wavelength regions are substantially the same; and an optical laminate B including a plurality of types of optical layers having different refractive indices laminated on each other, the optical laminate B having a reflection characteristic in which the bottom of the reflectance curve lies in the green wavelength region.

2 Claims, 7 Drawing Sheets

OPTICAL MULTILAYER FILM AND
REFLECTIVE SCREEN

CROSS REFERENCES TO RELATED APPLICATIONS

This application claims priority to Japanese Patent Document Nos. 2004-181078 filed on Jun. 18, 2004; 2004-254329 filed on Sep. 1, 2004; and 2005-142704 filed on May 16, 2005 with the Japanese Patent Office, which disclosures in its entirety is hereby incorporated by reference.

BACKGROUND OF THE INVENTION

The present invention relates to optical multilayer films and reflective screens, and more particularly relates to screens on which projected images from projection-type projectors, such as, video projectors, film projectors, and overhead projectors, are displayed. In particular, the present invention relates to optical multilayer films which reflect selected wavelengths, which provide high-contrast images projected by projector light even in a bright environment, and in which high color reproducibility is achieved; and screens including such optical multilayer films.

Recently, overhead projectors and slide projectors have widely been used to present information in meetings and the like. Furthermore, video projectors and motion picture film projectors including liquid crystal have become widely used in ordinary homes. In these projectors, light from a light source is modulated, for example, by a transmissive liquid crystal panel, to form image light, and the image light is projected onto a screen through an optical system, such as a lens.

For example, a front projector capable of forming a color image on a screen includes an illuminating optical system which separates light emitted from a light source into red (R), green (G), and blue (B) color beams and converges each color beam into a predetermined light path; a liquid crystal panel (light valve) which modulates the respective color beams of R, G, and B separated by the illuminating optical system; and a light-synthesizing unit which synthesizes the respective color beams of R, G, and B modulated by the liquid crystal panel. A color image synthesized by the light-synthesizing unit is enlarged and projected on a screen by a projector lens.

Recently, another type of projector has been developed in which a narrow-band three primary color light source is used and the respective color beams of R, G, and B are spatially modulated by a grating light valve (GLV) instead of a liquid crystal panel.

In the projectors described above, projection screens are used for displaying projected images. The projection screens are broadly classified into two types, i.e., a transmissive type in which projected light is emitted from the rear side of the screen and the image is viewed from the front side of the screen, and a reflective type in which projected light is emitted from the front side of the screen and the projected light reflected from the screen is viewed. In either type, it is necessary to produce bright, high-contrast images in order to achieve a screen with high visibility.

However, in front projectors, unlike light self-emitting displays and rear projectors, it may be impossible to reduce reflection of external light, for example, using a neutral density (ND) filter, and it is difficult to increase the contrast on the reflective screen in a bright environment.

In order to overcome such a problem, a reflective screen has been proposed which includes an optical thin film composed of a dielectric multilayer film (optical multilayer film) which has a high reflection characteristic with respect to light in a specific wavelength region and a high transmission characteristic with respect to at least light in the visible wavelength region other than the light in the specific wavelength region. The thicknesses of the individual optical layers in the dielectric multilayer film are designed according to a simulation based on a matrix method. For example, refer to Japanese Unexamined Patent Application Publication No. 2003-270725.

In the screen described above, the optical multilayer film serves as a band-pass filter, and most of light in a specific wavelength region is reflected by the action of the optical multilayer film. Furthermore, for example, when external light is incident on the screen, most of the light other than the light in the specific wavelength region is transmitted through the optical thin film and is not substantially reflected.

As described above, in the reflective screen, only light with a specific wavelength can be selectively reflected, and reflection of external light can be relatively suppressed compared with the commonly used screens. Consequently, the contrast of the image formed on the screen can be prevented from decreasing and reflection of external light can be effectively reduced. Thereby, a bright image can be produced. Furthermore, in the reflective screen, even if the projection environment is bright, a clear image can be produced. Thus, it is possible to obtain a clear image without being affected by the brightness of the environment. In particular, in the case when a light source, such as a GLV, has a steep spectrum, and the full width at half-maximum of the spectrum of the light source is narrow relative to the full width at half-maximum of the reflectance profile in a specific wavelength region of the screen, significantly high contrast can be achieved, and the capability of the light source can be fully utilized.

However, even if the reflective screen described above is used, in the case of a LCD projector using a high-pressure mercury lamp (UHP lamp), the white balance of image light becomes greatly disturbed, giving rise to a problem.

It is desirable to provide an optical multilayer film in which the chromaticity of reflected light is adjusted and uniform color representation is achieved over the entire display, and a reflective screen including the optical multilayer film.

SUMMARY

An optical multilayer film according to an embodiment of the present invention includes a plurality of types of optical layers having different refractive indices laminated on a substrate, the optical multilayer film exhibiting a high reflection characteristic having respective reflectance peaks with respect to light in the red, green, and blue wavelength regions and a high transmission characteristic with respect to at least light in the visible wavelength region other than the light in the red, green, and blue wavelength regions, wherein the reflectance peak intensities in the red and/or blue wavelength regions are higher than the reflectance peak intensity in the green wavelength region.

Preferably, the reflection peak intensities in the red and/or blue wavelength regions are at least 1.2 times the reflectance peak intensity in the green wavelength region.

An optical multilayer film according to another embodiment of the present invention includes a plurality of types of optical layers having different refractive indices laminated on each other on a substrate, the optical multilayer film exhibiting a high reflection characteristic having respective reflectance peaks with respect to light in the red, green, and blue wavelength regions and a high transmission characteristic with respect to at least light in the visible wavelength region other than the light in the red, green, and blue wavelength regions, wherein the red and/or blue wavelength regions have a plurality of reflectance peaks with a reflectance of 40% or more.

An optical multilayer film according to another embodiment of the present invention includes an optical laminate A including a plurality of types of optical layers having different refractive indices laminated on each other, the optical laminate A having a reflection characteristic in which the reflectance peak intensities in the red, green, and blue wavelength regions are substantially the same, and an optical laminate B including a plurality of types of optical layers having different refractive indices laminated on each other, the optical laminate B having a reflection characteristic in which the bottom of the reflectance curve lies in the green wavelength region.

A reflective screen for reflecting light from a light source to display an image according to another embodiment of the present invention includes any one of the optical multilayer films described above, a light absorption layer which absorbs light transmitted through the optical multilayer film, and a light-scattering layer which scatters light reflected from the optical multilayer film, the light-scattering layer being disposed on the outermost layer of the optical multilayer film.

Preferably, the light source is a high-pressure mercury lamp.

According to an embodiment of the present invention, since the chromaticity of the reflected light is adjusted in response to the spectrum of the light source of the projector, uniform color representation is achieved over the entire display. At the same time, selective reflection is enabled in which light in a specific wavelength region from the projector is reflected, and incident light in the wavelength other than the specific wavelength region, such as external light, is transmitted/absorbed. Consequently, the black level of the image on the screen is decreased to achieve high contrast, enabling to display a high-contrast image even if the room is bright.

Additional features and advantages of the present invention are described in, and will be apparent from, the following Detailed Description and the figures.

DETAILED DESCRIPTION

A reflective screen according to an embodiment of the present invention will be described. It is to be understood that the present invention is not limited to the description below, and various modifications can be made within the scope not deviating from the object of the invention.

First, a structure of a reflective screen on which the present invention is premised will be described.

Figure 1:
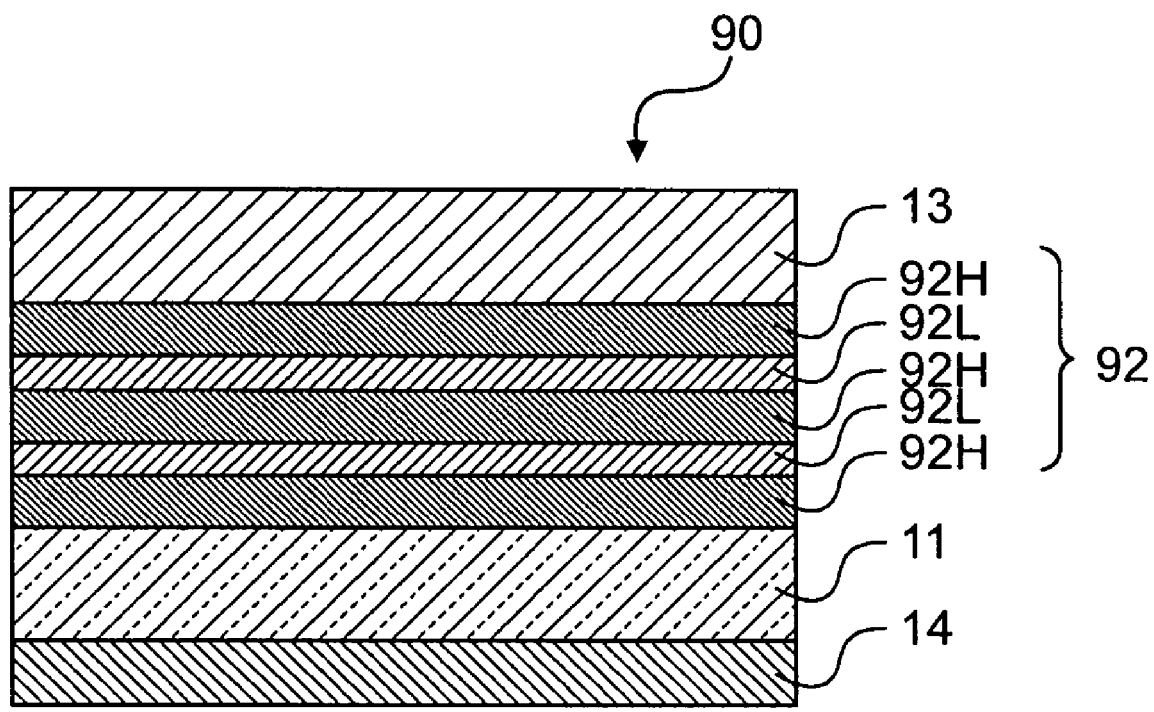
FIG. 1 is a cross-sectional view showing a structure of a reflective screen according to an embodiment of the present invention.

FIG. 1 is a cross-sectional view showing a structure of a reflective screen on which the present invention is premised. As shown in FIG. 1, a reflective screen 90 includes an optical multilayer film 92 and a light-scattering layer 13 deposited in that order on a front surface of a substrate 11, and a light absorption layer 14 disposed on a rear surface of the substrate 11.

The optical multilayer film 92 includes a plurality of layers, i.e., high-refractive-index layers 92H and low-refractive-index layers 92L alternately laminated on each other. The optical multilayer film 92 exhibits a high reflection characteristic having respective reflectance peaks with respect to light in the red (R), green (G), and blue (B) wavelength regions (RGB three primary color wavelength regions), and a high transmission characteristic with respect to at least light in the visible wavelength region other than the RGB three primary color wavelength regions.

The thicknesses of the individual layers in the optical multilayer film 92 are designed according to a simulation based on a matrix method such that the optical multilayer film 92 exhibits a high reflection characteristic with respect to light in a specific wavelength region and a high transmission characteristic with respect to at least light in the visible wavelength region other than the light in the specific wavelength region. The simulation based on the matrix method is a technique disclosed in Japanese Unexamined Patent Application Publication No. 2003-270725. The simulation is performed using an equation based on a principle that when light is incident at an angle θ0 on a multilayer optical thin film system including a plurality of layers composed of different materials in which multiple reflection occurs at the interfaces between the individual layers, the phases may coincide depending on the type and wavelength of the light source used and the optical thickness (product of refractive index and geometric thickness) of each layer, and the velocities of reflected light may be coherent so that the interference effects may be produced between them. According to such a simulation, the thickness of an optical film having desired characteristics is designed.

Furthermore, by selecting RGB three primary color light wavelength regions, which are used as image light in a projector light source, as the specific wavelength region, the thicknesses are designed according to the simulation based on the matrix method such that light in these wavelength regions only is reflected and light in the other wavelength region is transmitted. By laminating the high-refractive-index layers 92H and the low-refractive-index layers 92L which have the thicknesses determined as described above, the optical multilayer film 92 is allowed to serve as a band-pass filter which reflects light in the three primary color wavelength regions.

Specifically, the thicknesses of the high-refractive-index layer 92H and the low-refractive-index layer 92L are set as described below. In general, when a material having a refractive index that is higher than that of a material of a substrate is disposed on the substrate, in order to allow a wavelength λc to have a reflectance peak, the target thickness d is required to satisfy Formula (1):

$$d = m \cdot (\lambda c/4)/n \qquad (1)$$

where d is the target thickness, m is an odd number, λc is the wavelength, and n is the refractive index of optical layer.

Herein, m corresponds to an optical distance (qwot) with λc/4 being a unit, and by setting m as an odd number, a reflectance peak is situated at the wavelength λc. Incidentally, if m is set as an even number, in the reflectance curve, the bottom is situated at the wavelength λc. Furthermore, the thickness d increases and decreases in proportion to the value m (number of qwot).

In the case of an optical multilayer film in which high-refractive-index layers 92H and low-refractive-index layers 92L are alternately laminated and when the outermost layer is a high-refractive-index layer 92H, if the individual layers are set so as to have the same qwot of odd number, the reflectance peaks are distributed at substantially regular intervals with the wavelength λc at the center. As the number of qwot is increased, i.e., as the thickness of the optical layer is increased, the distance between peaks is narrowed. As the number of lamination is increased, the individual reflectance peak intensities are improved. In the optical multilayer film 92 shown in FIG. 1, the wavelength λc is set at 530 to 570 nm and the number of qwot of each of the individual layers is set at 11, 13, or 15 so that the RGB wavelength regions each have one reflectance peak with substantially the same reflectance. In an optical multilayer film disclosed in Japanese Unexamined Patent Application Publication No. 2004-61546, these design values are used.

The substrate 11 serves as a support for the reflective screen 90 and is composed of a flexible polymer. The light-scattering layer 13 scatters light reflected from the optical multilayer film 92 to produce scattered light, and the light absorption layer 14 absorbs light transmitted through the optical multilayer film 92.

The reflective screen 90 including the optical multilayer film 92 can reflect only light in the RGB three primary color wavelength regions required for displaying an image from a projector and effectively eliminate the influence of external light. Consequently, significantly high contrast and color reproducibility can be achieved even in an environment of interior light or sunlight.

In the commercially available projectors, the most commonly used light source lamp is a high-pressure mercury lamp (hereinafter referred to as a "UHP lamp"). If light is projected to the reflective screen 90 from a LCD projector using a UHP lamp or the like as a light source, however, a part of the light source spectrum is also cut, resulting in a great disturbance in the white balance of reflected light.

Figure 2:
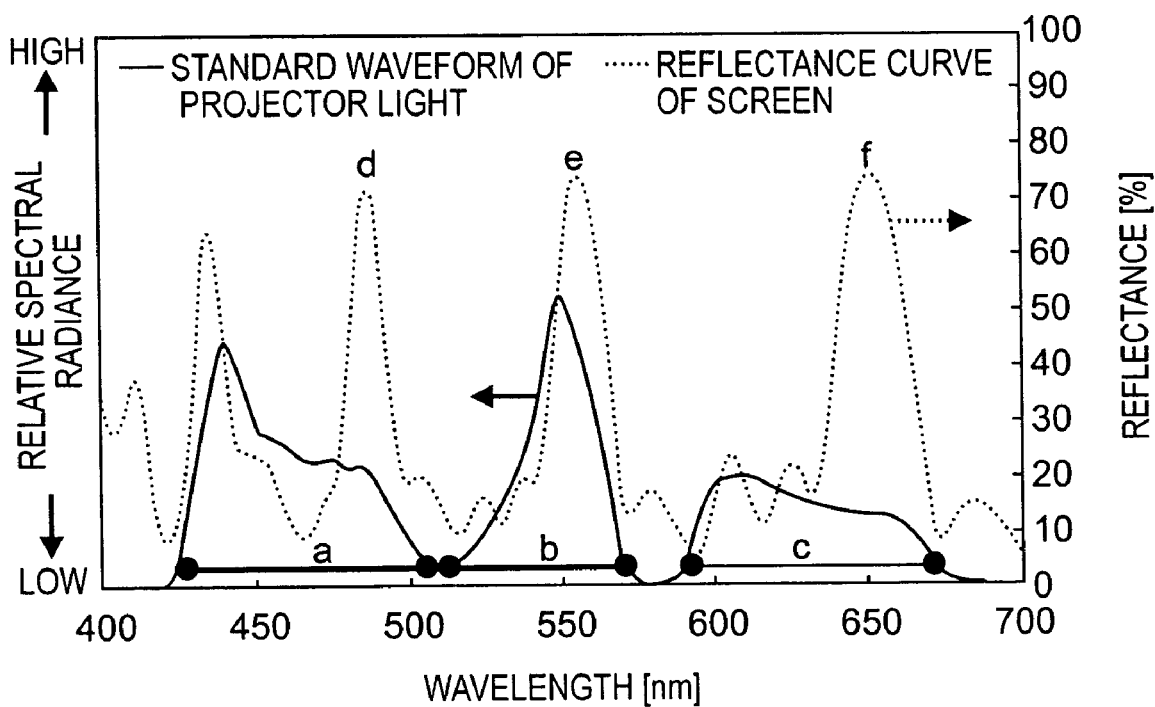
FIG. 2 is a graph showing a relationship between the reflection characteristics of the reflective screen shown in FIG. 1 and the light source spectrum of a projector using a high-pressure mercury lamp.

An example of such a case is shown in FIG. 2. FIG. 2 shows a standard waveform of projector light in which a UHP lamp is used as a light source (indicated by the solid line in FIG. 2) and a reflectance curve of the reflective screen 90 shown in FIG. 1 (indicated by the broken line in FIG. 2). The optical multilayer film 92 in the reflective screen 90 has a five-layer structure. The wavelength λc is set at 550 nm. With respect to the setting of the thicknesses of the individual optical layers, the number of qwot is set at 13.

As is evident from overlapping of these two curves, the components of projected light in the three primary color wavelength regions can be reflected by the reflective screen 90. The luminance peak in the wavelength region a corresponding to the component B of the projector light and the luminance peak in the wavelength region c corresponding to the component R are partially reflected due to the reflectance peaks d and f of the reflective screen 90, while most of the luminance peak in the wavelength region b corresponding to the component G is reflected due to the reflectance peak e of the screen. Consequently, the resulting image reflected from the screen appears greener than the image originally intended to be presented by the projector.

Examples of the conceivable method for correcting the greenish image to the image having the original chromaticity include a method in which the color adjustment function of the projector itself is used and a method in which a pigment or dye which absorbs only light in the green wavelength region is charged in the layers of the optical multilayer film in the screen. However, in the former correction method, since the user himself or herself performs the color adjustment of the projector light, correction to the precise standard color is difficult, and the operation itself is time-consuming. Moreover, depending on the product, such an adjustment function may not be provided. In the latter correction method, when the screen is viewed from an oblique direction other than from the direct front side, the percentage of the total reflection component of external light at the uppermost selective film reaching the viewer increases. As a result, the projected light is strongly affected by the color of the pigment or dye, and the projected image is tinted with the color of the pigment or dye. Even if the image is viewed from the direct front side, the same phenomenon is likely to occur at the edges of the screen, and it is extremely difficult to achieve uniform color representation over the entire screen.

An embodiment of the present invention is characterized in that the function of correcting the deviation of the chromaticity point is provided to an optical multilayer film.

Figure 3:
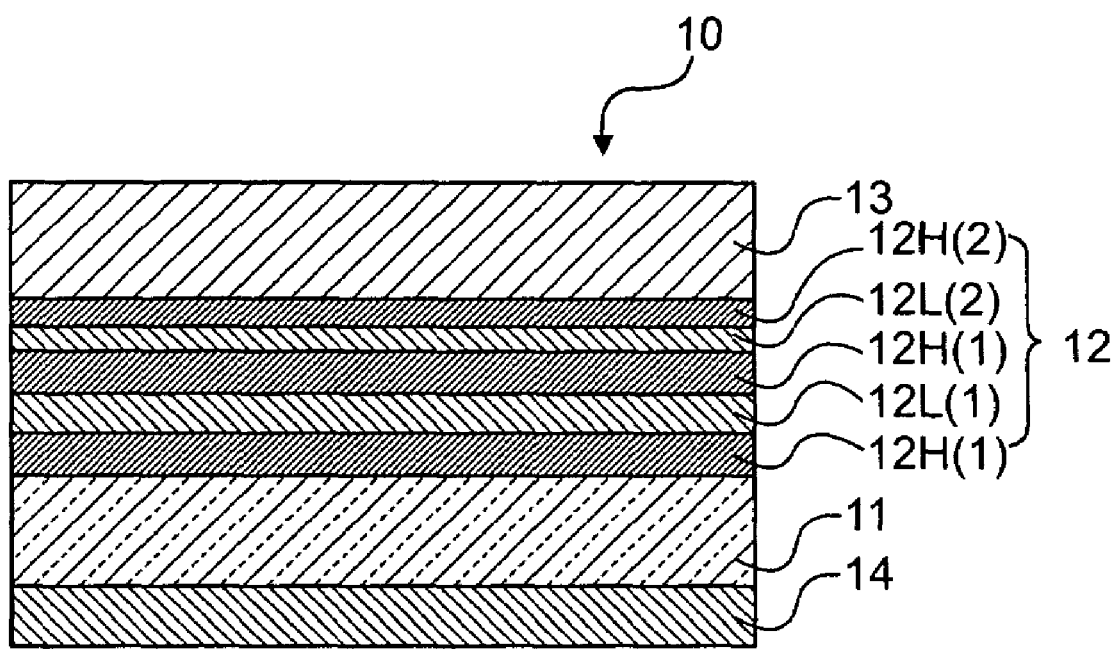
FIG. 3 is a cross-sectional view showing a structure of a reflective screen according to an embodiment of the present invention.

FIG. 3 is a cross-sectional view showing a structure of a reflective screen according to an embodiment of the present invention. A reflective screen 10 includes an optical multilayer film 12 and a light-scattering layer 13 disposed in that order on a front surface of a substrate 11, and a light absorption layer 14 is disposed on a rear surface of the substrate 11.

The substrate 11 is transparent and is composed of any material that satisfies the desired optical characteristics. Examples of such a material include a transparent film, a glass plate, an acrylic plate, a methacrylic styrene plate, a polycarbonate plate, and a lens. With respect to the optical characteristics, preferably, the material constituting the substrate 11 has a refractive index of 1.3 to 1.7, a haze value of 8% or less, and a transmittance of 80% or more. Furthermore, an anti-glare function may be imparted to the substrate 11.

The transparent film is preferably a plastic film. Preferred examples of the material constituting the film include cellulose derivatives (e.g., diacetyl cellulose, triacetyl cellulose (TAC), propionyl cellulose, butylyl cellulose, acetylpropionyl cellulose, and nitrocellulose); (meth)acrylic resins, such as poly(methyl methacrylate) and copolymers of methyl methacrylate and other vinyl monomers, for example, alkyl (meth)acrylates and styrene; polycarbonate resins, such as polycarbonate and diethylene glycol bis(allyl carbonate) (CR-39); thermosetting (meth)acrylic resins, such as homopolymers or copolymers of (brominated)bisphenol A-type di(meth)acrylates, and homopolymers or copolymers of urethane-modified monomers of mono(meth)acrylates of (brominated)bisphenol A; polyesters, in particular, polyethylene terephthalate, polyethylene naphthalate, and unsaturated polyesters; acrylonitrile-styrene copolymers, polyvinyl chloride, polyurethanes, and epoxy resins. Furthermore, use of aramid resins in consideration of heat resistance is also possible. In such a case, the upper limit of the heating temperature is 200° C. or more, and it is expected that the temperature range therefor will be increased.

The plastic film can be produced, for example, by stretching any of these resins or diluting any of these resins in a solvent and forming the resulting solution into a film, followed by drying. The larger thickness of the film is preferable in view of rigidity, while the smaller thickness of preferable in view of haze. The thickness is usually about 25 to 500 μm.

The surface of the plastic film may be coated with a coating material, such as a hard coat. By allowing the coating material to be present under the optical multilayer film composed of an inorganic substance and an organic substance, it is possible to improve physical properties, such as adhesion, hardness, chemical resistance, durability, and dyeing properties.

The optical multilayer film 12 includes a plurality of types of optical layers having different refractive indices laminated on each other, the optical multilayer film 12 exhibiting a high reflection characteristic having respective reflectance peaks with respect to light in the RGB wavelength regions and a high transmission characteristic with respect to at least light in the visible wavelength region other than the light in the RGB wavelength regions. In the reflectance curve of the optical multilayer film 12, the reflectance peak intensities in the R (red) and/or B (blue) wavelength regions are higher than the reflectance peak intensity in the G (green) wavelength region. The number of the optical layers constituting the optical multilayer film 12 is not particularly limited and any desired number of optical layers may be selected. Preferably, an odd number of optical layers is selected (i.e., 2n+1 layers, wherein n is an integer of 1 or more), and high-refractive-index layers are disposed as outermost layers on the incident side and the opposite side. Namely, in FIG. 3, a high-refractive-index layer 12H(1) is first disposed on a front surface of the substrate 11, subsequently, a low-refractive-index layer 12L(1) and a high-refractive-index layer 12H(1) are disposed in that order thereon, and a low-refractive-index layer 12L(2) is further disposed thereon. Finally, a high-refractive-index layer 12H(2) is disposed thereon. Additionally, the high-refractive-index layer 12H(1) and the high-refractive-index layer 12H(2) are high-refractive-index optical layers having the same composition (the same refractive index) with different thicknesses. Similarly, the low-refractive-index layer 12L(1) and the low-refractive-index layer 12L(2) are low-refractive-index optical layers having the same composition (the same refractive index) with different thicknesses. With respect to the RGB wavelength regions, for example, the R wavelength region ranges from 600 to 670 nm, the G wavelength region ranges from 530 to 570 nm, and the B wavelength region ranges from 450 to 500 nm.

The target thickness of each optical layer constituting the optical multilayer film 12 is preferably set using a plurality of numbers of qwot with respect to m in the formula (1) described above. Furthermore, in the formula (1), the wavelength λc is preferably set as a wavelength at which the highest luminance peak is situated in the assumed light source spectrum profile of a projector.

Figure 4:
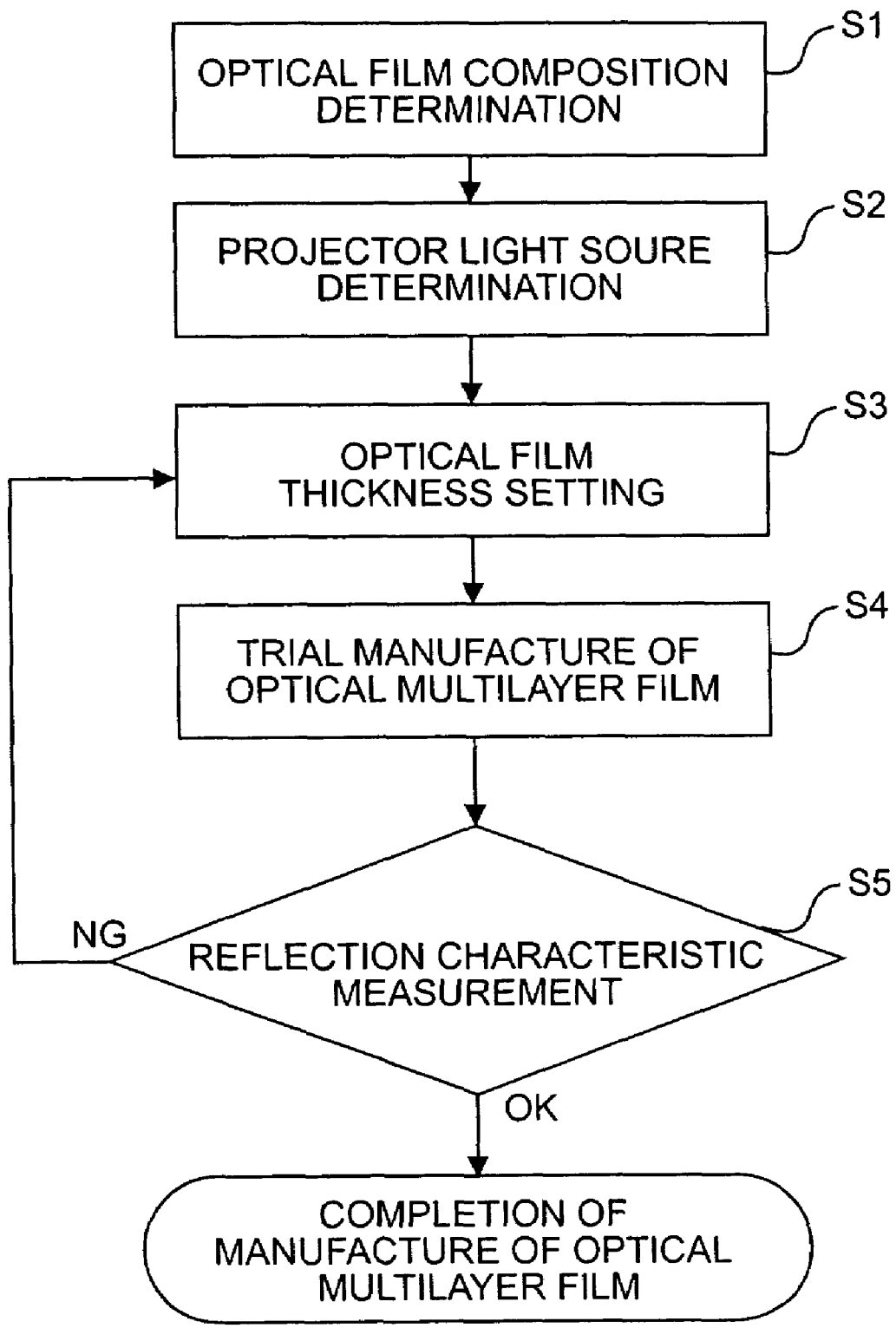
FIG. 4 is a flowchart regarding the setting of the thickness of an optical multilayer film according to an embodiment of the present invention.

Particularly, the target thickness is preferably set according to a procedure shown in FIG. 4.

(S1) Compositions of materials for optical layers for forming the high-refractive-index layer and the low-refractive-index layer are determined. Thereby, the respective refractive indices nH and nL of the high-refractive-index layer and the low-refractive-index layer are determined.

(S2) A projector light source is determined, and the wavelength at which the highest luminance peak is situated in the light source spectrum profile is confirmed. For example, the highest luminance peak of a UHP lamp is situated in a wavelength range of 530 to 570 nm although it may vary depending on the conditions.

(S3) Target thicknesses of the high-refractive-index layer and the low-refractive-index layer are set according to the formula (1) using the refractive indices nH and nL determined in step S1 and the wavelength λc confirmed in step S2.

Figure 5:
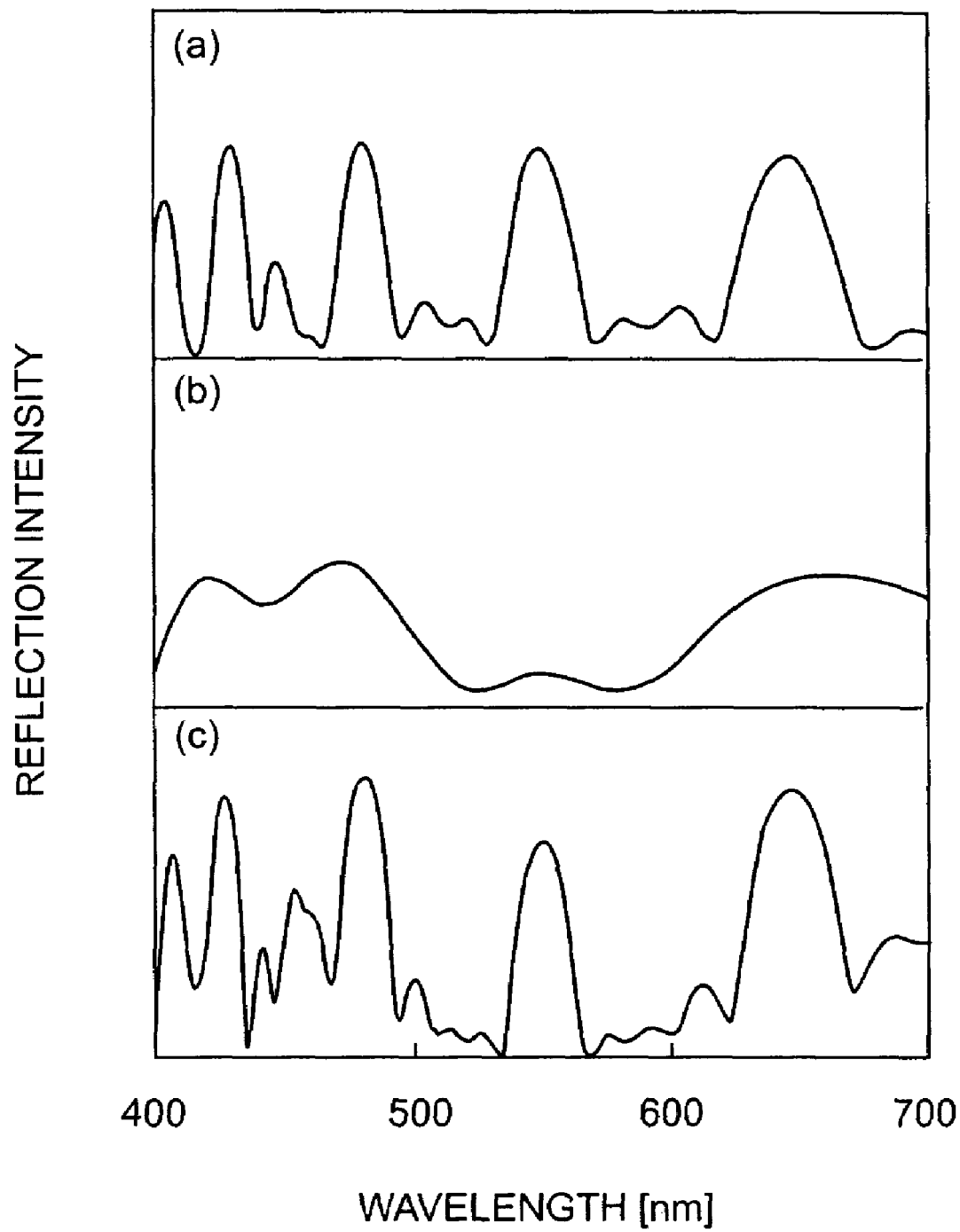
FIG. 5 is a schematic diagram showing designed waveforms and a composite waveform of an optical laminate constituting a reflective screen according to an embodiment of the present invention.

For example, when the number of qwot (m) is set to be odd with respect to first to third optical layers (12H(1)/12L(1)/12H(1)) from a substrate 11 and the laminate of the first to third optical layers is considered as an optical laminate A, the respective target thicknesses are preferably set so as to exhibit a reflectance characteristic that the RGB wavelength regions have substantially the same reflectance peak intensity. In such a case, the number of qwot is an odd number of 1 or more, and preferably an odd number from 9 to 19 (i.e., 9, 11, 13, 15, 17, or 19). If the number of qwot is less than 9, it is not possible to have a satisfactory reflectance peak in the R wavelength region as a reflection characteristic of the optical multilayer film 12. If the number of qwot exceeds 19, contrast is degraded. FIG. 5(a) shows an example in which the wavelength λc is set at 550 nm and the number of qwot is set at 13 in the optical laminate A having a three-layer structure.

When the number of qwot (m) is set to be even with respect to the fourth and fifth optical layers (12L(2)/12H(2)) from the substrate 11 and the laminate of the fourth and fifth optical layers is considered as an optical laminate B, the respective target thicknesses are preferably set so as to exhibit a reflectance characteristic that the bottom of the reflectance curve lies in the green (G) wavelength region. In such a case, the number of qwot is an even number of 2 or more, and preferably an even number from 2 to 12 (2, 4, 6, 8, 10, or 12). FIG. 5(b) shows an example in which the wavelength λc is set at 550 nm in the optical laminate B having a two-layer structure.

Next, when an optical multilayer film 12 is formed as a multilayer film having a five-layer structure by combining the optical laminate A and the optical laminate B, as shown in FIG. 5(c), in the reflectance curve, the reflectance peak intensity in the G wavelength region can be set lower than the reflectance peak intensities in the R and/or B wavelength regions. In other words, the reflectance peak intensities in the R and/or B wavelength regions are higher than the reflectance peak intensity in the G wavelength region.

Consequently, it is possible to prevent the image projected on the reflective screen 10 from becoming greenish, and the color balance can be adjusted without using a pigment or dye. Additionally, in the case in which the RGB wavelength regions each have one major peak as shown in FIG. 5(c), desirably, the reflection peak intensities in the red and/or blue wavelength regions are at least 1.2 times the reflectance peak intensity in the green wavelength region.

In the actual manufacture of the optical multilayer film 12, the optical multilayer film having desired reflection characteristics may not often be obtained by one step of setting target film thicknesses. In such a case, as shown in FIG. 4, the target film thicknesses can be corrected according to the procedure described below.

(S4) An optical multilayer film 12 is trial-manufactured with the target film thicknesses set in step S3.

(S5) With respect to the optical multilayer film 12 trial-manufactured in step S4, the reflection characteristics are measured to check if they are as desired.

That is, if the measurement result is NG, returning to Step S3, the target film thicknesses are reset. In such a case, a plurality of numbers of qwot may be adjusted respectively. For example, in order to adjust the RGB balance of reflected light by shifting the bottom in the reflectance curve of the optical multilayer film B, with respect to the even number of qwot, fine adjustment is performed in which the value below the decimal point is changed. If the measurement result is OK, the optical multilayer film is completed.

The optical multilayer film 12 may be considered as a multilayer film in which an optical laminate A including the high-refractive-index layers and the low-refractive-index layer and having the characteristic shown in FIG. 5(a) and an optical laminate B including the high-refractive-index layer and the low-refractive-index layer and having the characteristic shown in FIG. 5(b) are combined. Namely, in FIG. 3, the optical laminate A corresponds to a laminate of high-refractive-index layer 12H(1)/low-refractive-index layer 12L(1)/high-refractive-index layer 12H(1), and the optical laminate B corresponds to a laminate of low-refractive-index layer 12L(2)/high-refractive-index layer 12H(2).

Examples of the structure in which the optical laminates A and B are combined according to an embodiment of the present invention include the followings, in which the optical layers are indicated only by reference numerals.

(1) (Substrate 11)/12H(1)/12L(1)/12H(2)/12L(2)/12H(2)
in which the numbers of layers in the optical laminates A and B are changed.

(2) (Substrate 11)/12H(2)/12L(2)/12H(1)/12L(1)/12H(1)
in which the optical laminate A is disposed on the optical laminate B (3) (Substrate 11)/12H(2)/12L(2)/12H(2)/12L(1)/12H(1)
in which the optical laminate A is disposed on the optical laminate B and the numbers of layers are changed.

(4) (Substrate 11)/12H(1)/12L(2)/12H(1)/12L(1)/12H(2)
in which the arrangement of optical layers constituting the optical laminate A and the optical layers constituting the optical laminate B are interchanged.

(5) (Substrate 11)/12L(1)/12H(1)/12L(2)/12H(2)
in which the number of layers in the optical laminate A is changed.

Furthermore, the optical multilayer film 12 may be constructed so as to have a reflection characteristic in which the R and/or B wavelength regions have a plurality of reflectance peaks with a reflectance of 40% or more. In this way, it is also possible to prevent the image projected on the reflective screen 10 from becoming greenish. In such a case, when the thicknesses of the individual optical layers are set, a method is effective in which, with respect of a part of the optical layers constituting the optical multilayer film in which the number of qwot is odd, i.e., the optical laminate A, the number of qwot is set so as not to be an integer (have numerical values below the decimal point).

The high-refractive-index layers and the low-refractive-index layers each can be formed either by a dry process, such as sputtering, or by a wet process, such as spin coating or dip coating.

When the dry process is used, various materials having a refractive index of about 2.0 to 2.6 can be used for the high-refractive-index layers. Similarly, various materials having a refractive index of about 1.3 to 1.5 can be used for the low-refractive-index layers. For example, the high-refractive-index layers may be composed of $TiO_2$, $Nb_2O_5$, or $Ta_2O_5$, and the low-refractive-index layers may be composed of $SiO_2$ or $MgF_2$.

Furthermore, the number of optical layers constituting the optical multilayer film 12 formed by the dry process is not particularly limited and can be set as desired. Preferably, the optical multilayer film 12 is composed of an odd number of optical layers and is constructed so that the outermost layers on the light incident side and on the opposite side are high-refractive-index layers.

When the wet process is used, preferably, the optical multilayer film 12 is formed so as to have an odd number of layers in which the high-refractive-index layers obtained by applying and curing a solvent-type coating material for high-refractive-index layers and the low-refractive-index layers obtained by applying and curing a solvent-type coating material for low-refractive-index layers, which produces optical layers having a lower refractive index than that of the high-refractive-index layer, are alternately laminated. Furthermore, preferably, each optical layer is formed by application of a coating material containing a resin in which curing reaction is caused by absorption of energy applied by heating, ultraviolet irradiation, or the like. For example, preferably, the high-refractive-index layers are composed of a thermosetting resin manufactured by JSR Corporation, Opstar (JN7102, refractive index 1.68), and the low-refractive-index layers are composed of a thermosetting resin manufactured by JSR Corporation, Opstar (JN7215, refractive index 1.41). In this way, an optical multilayer film 12 having flexibility is obtained.

The material for the high-refractive-index layers is not limited to the thermosetting resin described above, and any solvent-type coating material which ensures a refractive index of about 1.6 to 2.1 may be used. The material for the low-refractive-index layers is not limited to the thermosetting resin described above, and any solvent-type coating material which ensures a refractive index of about 1.3 to 1.59 may be used. Additionally, as the difference in the refractive index between the high-refractive-index layer and the low-refractive-index layer is increased, the number of layers to be laminated can be decreased.

The light-scattering layer 13 is disposed on the outermost layer of the optical multilayer film 12 and scatters light reflected from the optical multilayer film 12. The material for the light-scattering layer 13 is not particularly limited and any known material can be used. For example, the light-scattering layer 13 may be composed of a layer in which beads are arrayed. In the light-scattering layer composed of the layer in which beads are arrayed, it is possible to design characteristics, such as an excellent light-scattering characteristic with respect to light in a specific wavelength region, depending on various conditions, such as the type and the size of the beads used. Furthermore, a film provided with a microlens array (MLA) may be used as the light-scattering layer.

The light absorption layer 14 is a black coating film formed by applying a black coating material on a rear surface of the substrate 11 or a black film attached to the rear surface of the substrate 11. The light absorption layer 14 has a function of absorbing light. The light absorption layer 14 absorbs light transmitted through the optical multilayer film 12, thereby preventing transmitted light from being reflected. Consequently, the reflective screen 10 can obtain only light in the RGB three primary color wavelength regions as reflected light more securely. Alternatively, by incorporating a black coating material or the like into the substrate 11 so that the substrate 11 has black color, the substrate 11 itself is allowed to function as a light absorption layer.

The chromaticity of reflected light is adjusted by the reflective screen 10 in response to the light source spectrum of the projector, thus enabling uniform color representation over the entire display. At the same time, selective reflection is enabled in which light in a specific wavelength region is reflected and incident light in the wavelength region other than the specific wavelength region, such as external light, is transmitted and absorbed. Consequently, the black level of the image on the screen 10 is decreased to achieve high contrast. Thus, it is possible to display a high-contrast image even if the room is bright.

Namely, light incident on the screen 10 passes through the light-scattering layer 13 to reach the optical multilayer film 12, the external light component contained in the incident light is transmitted through the optical multilayer film 12 and absorbed by the light absorption layer 14, and only light in the specific wavelength region associated with the image is selectively reflected. In this stage, incident light in the G wavelength region is reflected with the reflectance being reduced compared with incident light in the R and B wavelength regions, and thus the RGB balance as reflected light is achieved. Subsequently, the reflected light is scattered at the surface of the light-scattering layer 13 and provided as image light with a wide angle of view to the viewer. Consequently, the influence of external light to the image light which is the reflected light can be eliminated at a high level, and uniform color representation, which has not been possible in the past, and an increase in contrast are enabled.

Figure 6:
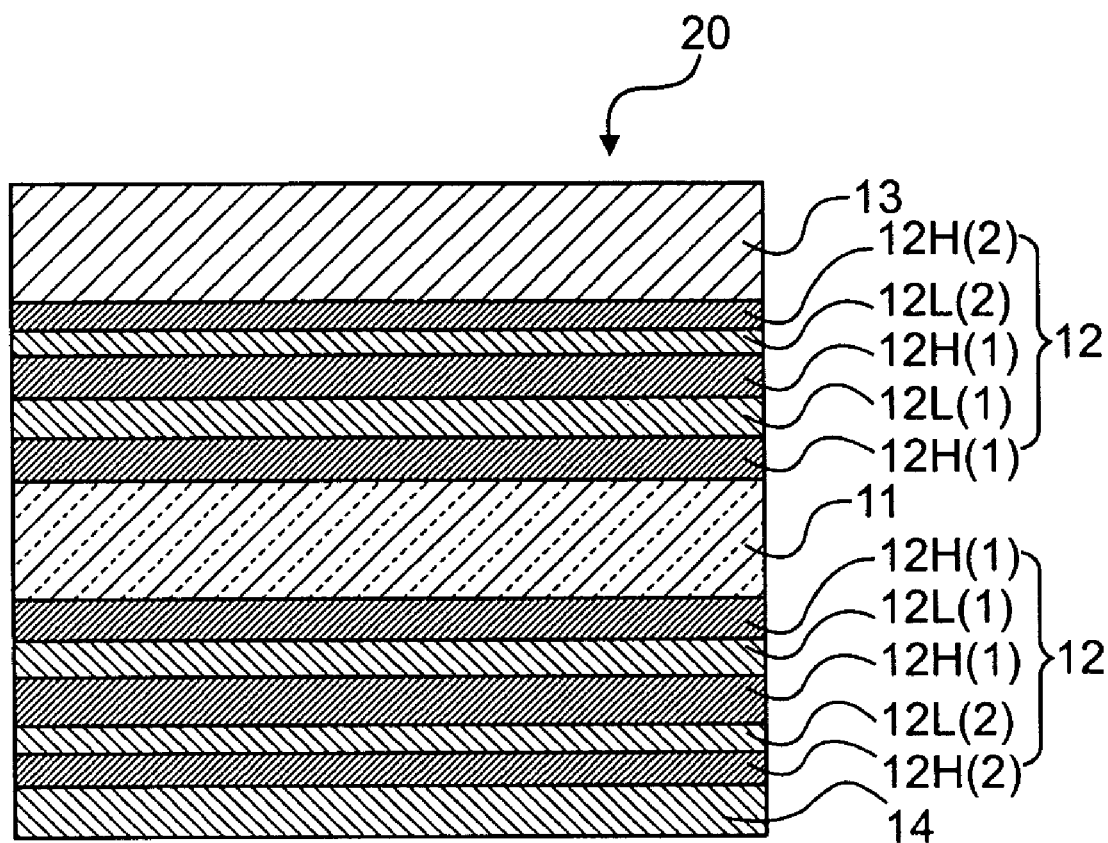
FIG. 6 is a cross-sectional view showing a structure of a reflective screen according to another embodiment of the present invention.

As a reflective screen according to another embodiment of the present invention, a structure shown in FIG. 6 may be employed, in which optical multilayer films 12 having the same structure are disposed on both surfaces of a substrate 11, and a light absorption layer 14 is disposed on the rear side of the substrate 11. In this screen, it is also possible to achieve high contrast as well as excellent color reproducibility by reflecting light in a specific wavelength region from the projector and transmitting and absorbing light in the wavelength region other than the specific wavelength region, such as external light, thus decreasing the black level on the screen.

Furthermore, preferably, a translucent layer which has a light-absorbing characteristic with respect to the visible region due to incorporation of a pigment or dye is provided at a portion corresponding to the reflection path of projector light of the reflective screen according to any of the embodiments of the present invention, i.e., between the light-scattering layer 13 and the optical multilayer film 12 in the reflective screen 10 or 20. Thereby, since it is possible to easily decrease only the reflection luminance of the screen, it is possible to decrease the black luminance of the image on the screen, i.e., to emphasize the darkness of the black image (higher level of black purity) of the image, while achieving the chromaticity balance of the light reflected by the optical multilayer film 12. Additionally, if the absorbance in a specific wavelength region is extremely higher or lower than that in the other wavelength region, it becomes difficult to maintain the chromaticity of the original image. Therefore, desirably, the absorption characteristic of the translucent layer is substantially uniform at least in the entire visible wavelength region. Furthermore, a visible wavelength absorbing pigment or dye for adjusting chromaticity may be mixed with the pigment or dye described above in the translucent layer.

Furthermore, instead of newly providing the translucent layer, the function of the translucent layer may be imparted by incorporating the pigment or dye into an adhesive layer for bonding the light-scattering layer 13 and the optical multilayer film 12 to each other or the light-scattering layer 13. Alternatively, a coating film containing the pigment or dye may be formed on the front surface or the back surface of the light-scattering layer 13.

Next, a method for manufacturing the reflective screen 10 in accordance with the embodiment of the present invention will be described below. Here, a case in which the optical multilayer film 12 is formed by a coating process will be described.

(S11) A polyethylene terephthalate (PET) film is prepared as a substrate 11, and a predetermined amount of a material A for high-refractive-index optical layer is applied onto a principal surface (front surface) of the substrate 11. The coating amount of the material A is set so as to achieve the target thickness of a high-refractive-index layer 12H(1) which has been set according to steps S1 to S5.

(S12) After the coating film of the material A is dried, curing is performed by irradiation of ultraviolet light to form the high-refractive-index layer 12H(1) with a predetermined thickness.

(S13) Subsequently, a predetermined amount of a material B for low-refractive-index optical layer is applied onto the high-refractive-index layer 12H(1). The coating amount of the material B is set so as to achieve the target thickness of a low-refractive-index layer 12L(1) which has been set according to steps S1 to S5.

(S14) After the coating film is dried, hot curing is performed to form the low-refractive-index layer 12L(1) with a predetermined thickness. Thereby, a laminate of the high-refractive-index layer 12H(1) and the low-refractive-index layer 12L(1) is produced.

(S15) Subsequently, the low-refractive-index layer 12L(1), which is the outermost layer from the substrate 11, is subjected to treatment according to steps S11 and S12 to form a high-refractive-index layer 12H(1). Thereby, an optical laminate A (12H(1)/12L(1)/12H(1)) is produced.

(S16) Subsequently, a predetermined amount of the material B for low-refractive index optical layer is applied onto the high-refractive-index layer 12H(1), which is the outermost layer from the substrate 11. The coating amount of the material B is set so as to achieve the target thickness of a low-refractive-index layer 12L(2) which has been set according to steps S1 to S5.

(S17) After the coating film is dried, hot curing is performed to form the low-refractive-index layer 12L(2) with a predetermined thickness.

(S18) Subsequently, a predetermined amount of the material A for high-refractive-index optical layer is applied onto the low-refractive-index layer 12H(2). The coating amount of the material A is set so as to achieve the target thickness of a high-refractive-index layer 12H(2) which has been set according to steps S1 to S5.

(S19) After the coating film of the material A is dried, curing is performed by irradiation of ultraviolet light to form a high-refractive-index layer 12H(1) with a predetermined thickness. Thereby, an optical laminate B (12L(2)/12H(2)) is produced. As a result, an optical multilayer film 12 in which the optical laminate A and the optical laminate B are combined is obtained.

(S1a) A plate-like light-scattering layer 13 is disposed on the outermost layer on the front side of the optical multilayer film 12 with an adhesive layer or a pressure-sensitive adhesive layer therebetween, a surface opposite to the uneven surface of the light-scattering layer 13 being brought into contact with the optical multilayer film 12.

(S1b) A resin containing a black-colored light-absorbing agent is applied to a surface (rear surface) of the substrate 11 opposite to the surface provided with the optical multilayer film 12 to form a black-colored light absorption layer 14. A reflective screen 10 according to the embodiment of the present invention is thereby completed.

As the coating method for the materials A and B for optical layers, any known coating method, such as dipping, gravure coating, roll coating, blade coating, die coating, or cap coating, may be used.

EXAMPLES

Examples according to an embodiment of the present invention will be described below. It is to be understood that the present invention is not limited to these examples.

Example 1

Compositions of a coating material (I) which is a material for high-refractive-index layers and a coating material (II) which is a material for low-refractive-index layers, a method for forming an optical multilayer film, and a method for manufacturing a screen in Example 1 will be described below.

(1) Coating Material (I)
Pigment fine particles: $TiO_2$ fine particles
(manufactured by Ishihara Sangyo Kaisha, Ltd.; average particle size: about 20 nm; refractive index: 2.48)
100 parts by weight (2.02% by weight)
Binder: $SO_3Na$ group-containing urethane acrylate
(number-average molecular weight: 350; $SO_3Na$ concentration: $1\times10^{-1}$ mol/g)
9.2 parts by weight (0.19% by weight)
Dispersant: polyoxyethylene phosphate ester
7.5 parts by weight (0.15% by weight)
Organic solvent: methyl isobutyl ketone (MIBK)
4,800 parts by weight (97.19% by weight)
UV curable resin: mixture of dipentaerythritol hexaacrylate and dipentaerythritol pentaacrylate
(manufactured by Nippon Kayaku Co., Ltd.; trade name: DPHA) 22 parts by weight (0.45% by weight)

The predetermined amounts of the pigment fine particles, the dispersant, the binder, and the organic solvent were mixed and dispersion treatment was performed with a paint shaker to prepare a fine particle dispersion liquid. Subsequently, the UV curable resin was added thereto and stirring was performed with a stirrer to produce a coating material (I). With respect to an optical film formed using the coating material (I), the refractive index was measured with a Filmetrix (manufactured by Matsushita Intertechno Co., Ltd.). As a result, the average refractive index in the visible region was 1.94.

(2) Coating Material (II)
Binder: carboxyl group-terminated perfluorobutenyl vinyl ether polymer
100 parts by weight (5.66% by weight)
Organic solvent: mixed solvent of fluorine-containing alcohol ($C_6F_{13}C_2H_4OH$) and perfluorobutylamine (mixing ratio 95:5) 1,666 parts by weight (94.34% by weight)

The binder and the organic solvent were mixed and thoroughly stirred to prepare a coating material (II). With respect to an optical film formed using the coating material (II), the refractive index was measured with a Filmetrix (manufactured by Matsushita Intertechno Co., Ltd.). As a result, the average refractive index in the visible region was 1.34.

(3) Setting of Target Film Thickness
(S21) As described above, the high-refractive-index layer had a refractive index nH of 1.94 and the low-refractive-index layer had a refractive index nL of 1.34.

(S22) A UHP lamp was selected as a projector light source, and from the light source spectrum profile, the wavelength λc at which the highest luminance peak was situated was confirmed to be 550 nm.

(S23) Using the refractive indices nH and nL determined in step S21 and the wavelength λc confirmed in step S22, based on the premise of a structure of the optical multilayer film 12 shown in FIG. 6, the target thicknesses of the high-refractive-index layer and the low-refractive-index layer were set according to the formula (1) described above. Specifically, the target thicknesses were set according to the formula (1) with the number of qwot of the optical laminate A being 13. The target thickness of the high-refractive-index layer 12H(1) was set at 921 nm, and the target thickness of the low-refractive-index layer 12L(1) was set at 1,334 nm. Subsequently, by setting the number of qwot of the low-refractive-index layer 12L(2) at 8 and the number of qwot of the high-refractive-index layer 12H(2) at 4 in the optical laminate B, the target thicknesses were respectively set at 821 nm and 284 nm according to the formula (1).

(4) Method for Manufacturing Reflective Screen
(S31) The coating material (I) was applied by a dipping process to each principal surface of a PET film (thickness: 188 μm; manufactured by Toray Industries, Inc.; trade name: U426). The coating amount of the coating material (I) was adjusted by controlling the pull-out speed so as to achieve the target thickness of 921 nm.

(S32) The coating films of the coating material (I) were dried at 80° C. and then ultraviolet (UV) cured (1,000 mJ/cm2) to form high-refractive-index layers 12H(1).

(S33) Subsequently, the coating material (II) was applied by a dipping process onto the high-refractive-index layers 12H(1). The coating amount of the coating material (II) was adjusted by controlling the pull-out speed so as to achieve the target thickness of 1,334 nm.

(S34) The coating films of the coating material (II) were dried at room temperature and then heat cured at 90° C. to form low-refractive-index layers 12L(1).

(S35) High-refractive-index layers 12H(1) were formed on the low-refractive-index layers 12L(1) under the same conditions as those described in steps S31 and S32. Thereby, an optical laminate A having a six-layer structure including three layers (12H(1)/12L(1)/12H(1)) laminated on the front surface of the PET film and three layers (12H(1)/12L(1)/12H(1)) laminated on the rear surface of the PET film was produced.

(S36) Subsequently, the coating material (II) was applied by a dipping process onto the optical laminate A. The coating amount of the coating material (II) was set so as to achieve the target thickness of 821 nm.

(S37) The coating films of the coating material (II) were dried at room temperature and then heat cured at 90° C. to form low-refractive-index layers 12L(2).

(S38) Subsequently, the coating material (I) was applied by a dipping process onto the low-refractive-index layers 12H(2). The coating amount of the coating material (I) was set so as to achieve the target thickness of 284 nm.

(S39) The coating films of the coating material (I) were dried at 80° C. and then ultraviolet (UV) cured (1,000 mJ/cm2) to form high-refractive-index layers 12H(2).

Thereby, an optical multilayer film 12 in which the optical laminate A and the optical laminate B were combined (having a ten-layer structure including five layers on each surface of the PET film) was produced.

(S3a) A sheet-like light-scattering layer was bonded to one of the optical multilayer films 12 with a pressure-sensitive adhesive film therebetween.

(S3b) A black PET film serving as a light absorption layer was bonded to the other optical multilayer film 12. Thereby, a reflective screen 20 shown in FIG. 6 was obtained.

In order to evaluate the resulting optical multilayer film, the spectral reflectance curve was measured using a spectrophotometer (V-550ST manufactured by JASCO), and the number of peaks with a reflectance of 40% or more was obtained for each of the wavelength regions, i.e., 450 to 500 nm, 530 to 570 nm, and 600 to 670 nm. Furthermore, the ratio (R/G) of the peak reflectance (R) in the wavelength region of 450 to 500 nm to the peak reflectance (G) in the wavelength region of 530 to 570 nm, and the ratio (B/G) of the peak reflectance (B) in the wavelength region of 450 to 500 nm to the peak reflectance (G) in the wavelength region of 530 to 570 nm were obtained. Additionally, when a plurality of reflectance peaks with a reflectance of 40% or more were present in one wavelength region, the reflectance ratio was calculated using the highest peak.

In order to evaluate the resulting reflective screen, chromaticity evaluation was performed by the method described below.

First, a white image was projected to a central region of the screen from a projector (HS20 manufactured by Sony Corp.) using a UHP lamp as a light source, and with respect to reflected light from the central region of the screen, the CIE 1960 uv chromaticity coordinates were measured with a spectroradiometer (CS1000 manufactured by Minolta). Subsequently, the distance Δuv between the coordinates and the full radiator locus was obtained. The lower Δuv value was considered to indicate better color reproducibility.

Furthermore, luminance was measured with the spectroradiometer when a white image was projected to the reflective screen, and then luminance was measured when a black image was projected. Contrast was determined based on the ratio between the luminance measured when the white image was projected and the luminance measured when the black image was projected.

Examples 2 and 3

A reflective screen was manufactured under the same conditions as in Example 1 except that the numbers of qwot of the high-refractive-index layers 12H(2) were respectively set at 6 and 5.8, and the target thicknesses thereof were respectively set at 425 nm and 412 nm. The resulting reflective screen was evaluated in the same manner.

Example 4

A reflective screen was manufactured under the same conditions as in Example 2 except that the number of qwot of the optical laminate A was set at 15, the target thickness of the high-refractive-index layer 12H(1) was set at 1,063 nm, and the target thickness of the low-refractive-index layer 12L(1) was set at 1,539 nm. The resulting reflective screen was evaluated in the same manner.

Example 5

A reflective screen was manufactured under the same conditions as in Example 1 except that the number of qwot of the low-refractive-index layer 12L(1) was set at 9.2, the number of qwot of the low-refractive-index layer 12L(2) was set at 10, the target thickness of the low-refractive-index layer 12L(1) was set at 944 nm, and the target thickness of the low-refractive-index layer 12L(2) was set at 1,026 nm. The resulting reflective screen was evaluated in the same manner.

Example 6

A reflective screen was manufactured under the same conditions as in Example 1 except that the lamination order of the optical layers were changed and the number of layers was changed such that a five-layer structure on each surface of the PET film was set as follows:

substrate 11/12H(2)/12L(2)/12H(2)/12L(1)/12H(1) in which the optical laminate A was disposed on the optical laminate B; the number of qwot of the high-refractive-index layer 12H(2) was set at 8; the number of qwot of the low-refractive-index layer 12L(2) was set at 4; the number of qwot of the low-refractive-index layer 12L(1) was set at 1; the number of qwot of the high-refractive-index layer 12H(1) was set at 13; the target thickness of the high-refractive-index layer 12H(2) was set at 567 nm; the target thickness of the low-refractive-index layer 12L(2) was set at 410 nm; the target thickness of the low-refractive-index layer 12L(1) was set at 103 nm; and the target thickness of the high-refractive-index layer 12H(1) was set at 921 nm. The resulting reflective screen was evaluated in the same manner.

Example 7

A reflective screen was manufactured under the same conditions as in Example 1 except that the optical multilayer film was formed so as to have a four-layer structure on each surface of the PET film without applying 12H(1) directly on the substrate 11, i.e., with the following structure:

substrate 11/12L(1)/12H(1)/12L(2)/12H(2); the number of qwot of the low-refractive-index layer 12L(1) was set at 9.1; the number of qwot of the high-refractive-index layer 12H(1) was set at 13; the number of qwot of the low-refractive-index layer 12L(2) was set at 10; the number of qwot of the high-refractive-index layer 12H(2) was set at 6.1; the target thickness of the low-refractive-index layer 12L(1) was set at 930 nm; the target thickness of the high-refractive-index layer 12H(1) was set at 921 nm; the target thickness of the low-refractive-index layer 12L(2) was set at 1,026 nm; and the target thickness of the high-refractive-index layer 12H(2) was set at 432 nm. The resulting reflective screen was evaluated in the same manner.

Example 8

A reflective screen was manufactured under the same conditions as in Example 4 except that the optical multilayer film was formed so as to have a four-layer structure on each surface of the PET film without applying 12H(1) directly on the substrate 11, i.e., with the following structure:

substrate 11/12L(1)/12H(1)/12L(2)/12H(2); the number of qwot of the high-refractive-index layer 12H(2) was set at 6.1; and the target thickness of the high-refractive-index layer 12H(2) was set at 432 nm. The resulting reflective screen was evaluated in the same manner.

Example 9

A reflective screen was manufactured under the same conditions as in Example 5 except that the material constituting each of the high-refractive-index layers 12H(1) directly on the substrate 11, i.e. first layers from the substrate 11, was changed to Nb2O5 (average refractive index in the visible region: 2.30), the number of qwot of the high-refractive-index layer 12H(1) was set at 13, and the target thickness thereof was set at 771 nm; the material constituting each of the low-refractive-index layers 12L(1), i.e., second layers form the substrate 11, was changed to SiO2 (average refractive index in the visible region: 1.45), the number of qwot of the low-refractive-index layer 12L(1) was set at 9.2, and the target thickness thereof was set at 869 nm; and the high-refractive-index layers 12H(1) (Nb2O5) and the low-refractive-index layers 12L(1) (SiO2) were formed by a dry process, such as vapor deposition or sputtering. The resulting reflective screen was evaluated in the same manner.

Comparative Example 1

A reflective screen was manufactured under the same conditions as in Example 1 except that the number of qwot was set at 11 for all of the five layers on each surface of the PET film, the target thickness of each of the high-refractive-index layers (12H(1) and 12H(2)) was set at 779 nm, and the target thickness of each of the low-refractive index layers (12L(1) and 12L(2)) was set at 1,129 nm. The resulting reflective screen was evaluated in the same manner.

Comparative Examples 2 and 3

Reflective screens were respectively manufactured under the same conditions as in Comparative Example 1 except that the number of qwot was respectively set at 13 and 15; the target thickness of each of the high-refractive-index layers (12H(1) and 12H(2)) was respectively set at 921 nm and 1,063 nm; and the target thickness of each of the low-refractive index layers (12L(1) and 12L(2)) was respectively set at 1,334 nm and 1,539 nm. The resulting reflective screens were evaluated in the same manner.

Comparative Example 4

A reflective screen was manufactured, the reflective screen including a metal layer composed of Al with a thickness of 100 nm disposed on a substrate 11 (PET film) and an optical multilayer film in which a dielectric layer (1) composed of Nb2O5, a light absorption layer composed of Nb with a thickness of 20 nm, the light absorption layer being light-transmissive, and a dielectric layer (2) composed of Nb2O5, were laminated in that order, the optical multilayer film being disposed on the metal layer. The resulting reflective screen was evaluated in the same manner. The number of qwot of each of the dielectric layers (1) and (2) was set at 9.4, the target thickness of each of the dielectric layers (1) and (2) was set at 560 nm, and the metal layer and the optical multilayer film were formed by sputtering.

Tables 1 and 2 show the number of qwot and the target thickness of each layer in Examples and Comparative Examples. The evaluation results in Examples and Comparative Examples are shown in Table 3.

As is evident from the evaluation results, with respect to the optical multilayer films in Examples 1, 4, and 7, two reflectance peaks with a reflectance of 40% or more are observed in the B wavelength region. With respect to the optical multilayer film in Example 9, two reflectance peaks with a reflectance of 40% or more are observed in the R wavelength region. In Example 5, two reflectance peaks with a reflectance of 40% of more are observed in the R and B wavelength regions.

With respect to the optical multilayer films in Examples 1 to 4, 6, and 7, both of the reflectance ratios R/G and B/G are 1.2 or more. In Examples 5 and 8, the reflectance ratio R/G is 1.2 or more. In Example 9, the reflectance ratio B/G is 1.1 or more. In contrast, with respect to each of optical multilayer films in Comparative Examples 1 to 4, both of the reflectance ratios R/G and B/G are less than 1.1.

Furthermore, with respect to each of the reflective screens in Examples 1 to 9, the Δuv value is 0.02 or less, indicating good color reproducibility. In contrast, with respect to each of the reflective screens in Comparative Examples 1 to 4, the Δuv value is high exceeding 0.02, indicating poor color reproducibility.

TABLE 1

| | Number of qwot | | | | |
|---|---|---|---|---|---|
| | First layer (H) | Second layer (L) | Third layer (H) | Fourth layer (L) | Fifth Layer (H) |
| Example 1 | 13 | 13 | 13 | 8 | 4 |
| Example 2 | 13 | 13 | 13 | 8 | 6 |
| Example 3 | 13 | 13 | 13 | 8 | 5.8 |
| Example 4 | 15 | 15 | 15 | 8 | 6 |
| Example 5 | 13 | 9.2 | 13 | 10 | 4 |
| Example 6 | 8 | 4 | 8 | 1 | 13 |
| Example 7 | — | 9.1 | 13 | 10 | 6.1 |
| Example 8 | — | 15 | 15 | 8 | 6.1 |
| Example 9 | 13 | 9.2 | 13 | 10 | 4 |
| Comparative Example 1 | 11 | 11 | 11 | 11 | 11 |
| Comparative Example 2 | 13 | 13 | 13 | 13 | 13 |
| Comparative Example 3 | 15 | 15 | 15 | 15 | 15 |
| Comparative Example 4 | — | 9.4 | — | 9.4 | — |

TABLE 2

| | Target thickness (nm) | | | | |
|---|---|---|---|---|---|
| | First layer (H) | Second layer (L) | Third layer (H) | Fourth layer (L) | Fifth Layer (H) |
| Example 1 | 921 | 1334 | 921 | 821 | 284 |
| Example 2 | 921 | 1334 | 921 | 821 | 425 |
| Example 3 | 921 | 1334 | 921 | 821 | 412 |
| Example 4 | 1063 | 1539 | 1063 | 821 | 425 |
| Example 5 | 921 | 944 | 921 | 1026 | 283 |
| Example 6 | 567 | 410 | 567 | 103 | 921 |
| Example 7 | — | 930 | 921 | 1026 | 432 |
| Example 8 | — | 1539 | 1063 | 821 | 432 |
| Example 9 | 771 | 869 | 921 | 1026 | 283 |
| Comparative Example 1 | 779 | 1129 | 779 | 1129 | 779 |
| Comparative | 921 | 1334 | 921 | 1334 | 921 |

TABLE 2-continued

| | Target thickness (nm) | | | | |
|---|---|---|---|---|---|
| | First layer (H) | Second layer (L) | Third layer (H) | Fourth layer (L) | Fifth Layer (H) |
| Example 2 Comparative Example 3 | 1063 | 1539 | 1063 | 1539 | 1063 |
| Comparative Example 4 | 100 (Al) | 560 ($Nb_2O_5$) | 20 (Nb) | 560 ($Nb_2O_5$) | — |

TABLE 3

| | Number of peaks with reflectance of 40% or more | | | Reflectance ratio | | uv chromaticity | | |
|---|---|---|---|---|---|---|---|---|
| | Wavelength region 450–500 nm | Wavelength region 530–570 nm | Wavelength region 600–670 nm | R/G | B/G | u value | v value | Δuv |
| Example 1 | 2 | 1 | 1 | 1.340 | 1.350 | 0.171 | 0.299 | 0.020 |
| Example 2 | 1 | 1 | 1 | 1.330 | 1.350 | 0.186 | 0.313 | 0.008 |
| Example 3 | 1 | 1 | 1 | 1.200 | 1.280 | 0.196 | 0.305 | 0.003 |
| Example 4 | 2 | 1 | 1 | 1.440 | 1.440 | 0.192 | 0.299 | 0.003 |
| Example 5 | 2 | 1 | 2 | 1.230 | 0.990 | 0.188 | 0.284 | 0.001 |
| Example 6 | 1 | 1 | 1 | 1.710 | 1.670 | 0.181 | 0.309 | 0.010 |
| Example 7 | 2 | 1 | 1 | 1.440 | 1.440 | 0.198 | 0.298 | 0.003 |
| Example 8 | 1 | 1 | 1 | 1.230 | 0.990 | 0.193 | 0.301 | 0.002 |
| Example 9 | 1 | 1 | 2 | 1.010 | 1.170 | 0.188 | 0.287 | 0.001 |
| Comparative Example 1 | 1 | 1 | 1 | 1.010 | 0.990 | 0.146 | 0.331 | 0.043 |
| Comparative Example 2 | 1 | 1 | 1 | 1.010 | 0.980 | 0.159 | 0.326 | 0.042 |
| Comparative Example 3 | 1 | 1 | 1 | 1.000 | 0.990 | 0.173 | 0.313 | 0.027 |
| Comparative Example 4 | 1 | 1 | 1 | 1.001 | 0.972 | 0.171 | 0.315 | 0.028 |

Example 10

Figure 7:
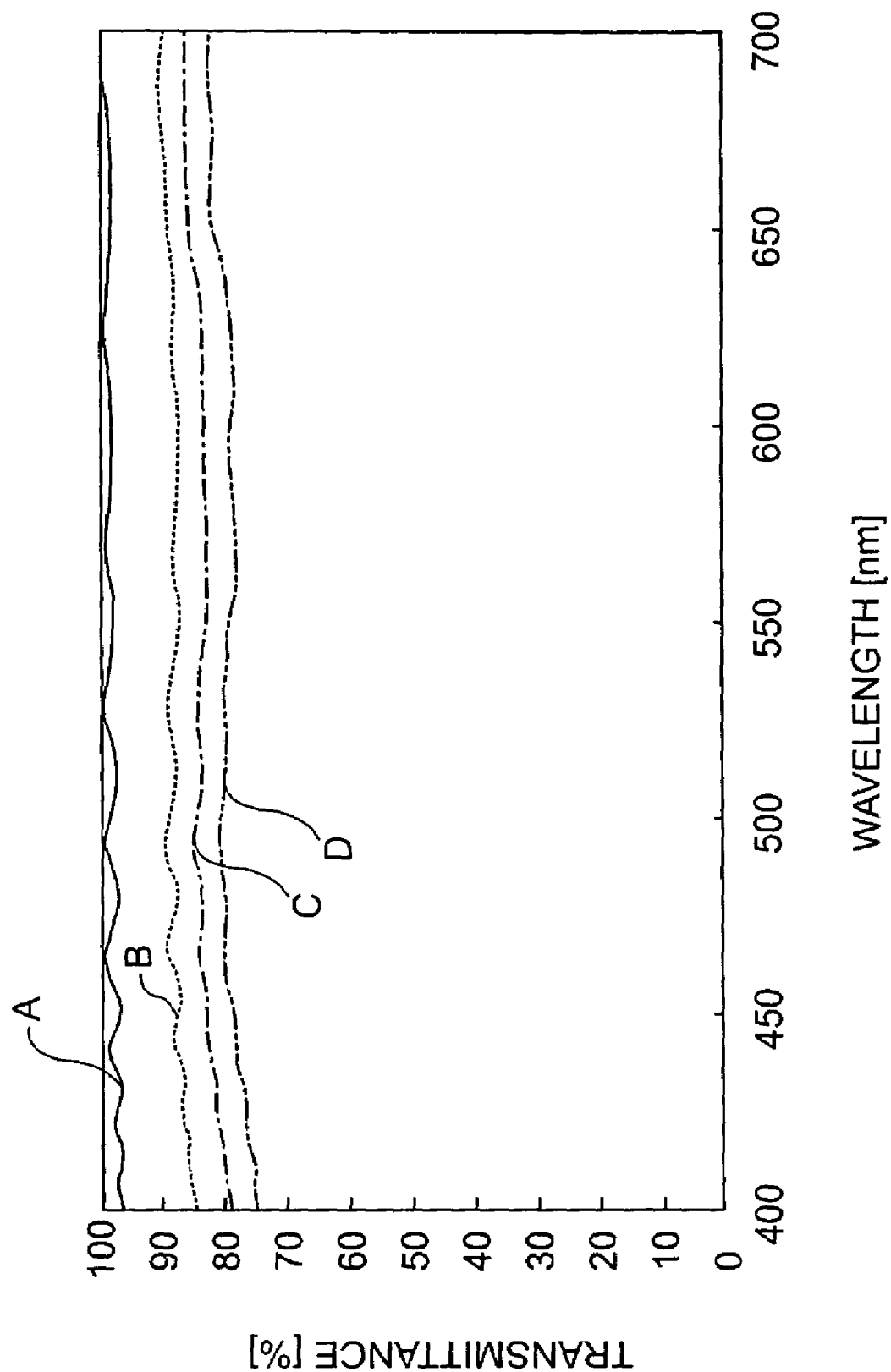
FIG. 7 is a graph showing spectral transmittance curve of pressure-sensitive adhesive films used in Example 10.

In Example 5, the transmittance (absorption characteristic) was varied by adding a carbon-based pigment with respect to the pressure-sensitive adhesive film used in step S3a in the method for manufacturing the reflective screen. Reflective screens were manufactured under the same conditions as in Example 1. Four types of pressure-sensitive adhesive films were used, i.e., a pressure-sensitive adhesive film A which was transparent as in Example 1 and pressure-sensitive adhesive films B, C, and D in which the carbon-based pigment was dispersed at different concentrations. FIG. 7 shows the measurement results of the spectral transmittance of these pressure-sensitive adhesive films.

The resulting reflective screens were considered as screens A, B, C, and D, respectively, including the pressure-sensitive adhesive films A, B, C, and D. Optical characteristics thereof were evaluated by the methods described below.

(1) White Luminance

A white image was projected to a central region of each sample screen from a projector (HS20 manufactured by Sony Corp.) using a UHP lamp as a light source (projection size 60 inch diagonal; aspect ratio 4:3). With respect to the projection image, luminance in the central region of the screen was measured with a spectroradiometer (CS1000 manufactured by Minolta). Additionally, the measuring room was illuminated with a halogen lamp serving as external light so that the change in black luminance due to the carbon-based pigment was easily measured, and the illuminance at the screen surface was set at 20 lx.

(2) Chromaticity Difference Δxy

Furthermore, with respect to reflected light during the projection of the white image, the CIE 1931 xy chromaticity coordinates were measured. Based on the white chromaticity (x, y) of the screen A and the respective chromaticities (x', y') of the other screens B, C, and D, chromaticity differences Δxy were calculated according to the following formula (2):

$$\Delta xy = ((x-x')2 + (y-y')2)1/2 \quad (2)$$

(3) Black Luminance

A black image was projected to a central region of each sample screen from a projector (HS20 manufactured by Sony Corp.) using a UHP lamp as a light source (projection size 60 inch diagonal; aspect ratio 4:3). With respect to the projection image, luminance in the central region of the screen was measured with a spectroradiometer (CS1000 manufactured by Minolta).

The evaluation results are shown in Table 4.

As is obvious from Table 4, by imparting a function of a translucent layer to the pressure-sensitive adhesive film for bonding the optical multilayer film and the light-scattering layer, the luminance can be changed arbitrarily and the darkness of the black image can be emphasized while restricting the chromaticity difference Δxy to 0.01 or less.

TABLE 4

| | Luminance (cd/m$^2$) | Chromaticity difference Δxy | Black luminance |
|---|---|---|---|
| Screen A | 131 | — | 1.9 |
| Screen B | 99 | 0.006 | 1.44 |
| Screen C | 87 | 0.007 | 1.26 |
| Screen D | 78 | 0.007 | 1.11 |

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An optical multilayer film comprising:
   an optical laminate A including a plurality of optical layers having different refractive indices laminated on each other, the optical laminate A having a reflection characteristic in which the reflectance peak intensities in the red, green, and blue wavelength regions are substantially the same; and
   an optical laminate B including a plurality of optical layers having different refractive indices laminated on each other, the optical laminate B having a reflection characteristic in which the bottom of the reflectance curve lies in the green wavelength region.

2. A reflective screen for reflecting light from a light source to display an image, the reflective screen comprising:
   an optical multilayer film including an optical laminate A including a plurality of optical layers having different refractive indices laminated on each other, the optical laminate A having a reflection characteristic in which the reflectance peak intensities in red, green, and blue wavelength regions are substantially the same; and
   an optical laminate B including a plurality of optical layers having different refractive indices laminated on each other, the optical laminate B having a reflection characteristic in which the bottom of the reflectance curve lies in the green wavelength region;
   a light absorption layer which absorbs light transmitted through the optical multilayer film; and
   a light-scattering layer which scatters light reflected from the optical multilayer film, the light-scattering layer being disposed on the outermost layer of the optical multilayer film.

* * * * *